(12) United States Patent
Klein et al.

(10) Patent No.: US 10,935,070 B2
(45) Date of Patent: Mar. 2, 2021

(54) MODULAR ROTATABLE CONNECTING JOINT

(71) Applicant: LIL MONKEY LTD., Shoham (IL)

(72) Inventors: Ido Klein, Shoham (IL); Alon Lavi, Shoham (IL); David Ashkenazi, Tel Aviv (IL)

(73) Assignee: LIL MONKEY LTD., Shoham (IL)

( * ) Notice: Subject to any disclaimer, the term of this patent is extended or adjusted under 35 U.S.C. 154(b) by 537 days.

(21) Appl. No.: 15/744,814

(22) PCT Filed: Jul. 13, 2016

(86) PCT No.: PCT/IL2016/050755
§ 371 (c)(1),
(2) Date: Jan. 14, 2018

(87) PCT Pub. No.: WO2017/009834
PCT Pub. Date: Jan. 19, 2017

(65) Prior Publication Data
US 2018/0209474 A1 Jul. 26, 2018

Related U.S. Application Data

(60) Provisional application No. 62/191,686, filed on Jul. 13, 2015.

(51) Int. Cl.
*F16C 11/10* (2006.01)
*F16C 11/06* (2006.01)
(Continued)

(52) U.S. Cl.
CPC ........ *F16C 11/0695* (2013.01); *A63H 33/101* (2013.01); *F16B 7/04* (2013.01);
(Continued)

(58) Field of Classification Search
CPC ...... F16C 11/0685; F16C 11/10; F16D 11/00; E04H 17/00; E04H 17/18; F16B 7/04; F16B 7/042; F16B 7/0473
See application file for complete search history.

(56) References Cited

U.S. PATENT DOCUMENTS

| 595,789 | A | * | 12/1897 | Smith | ...................... E04H 17/18 256/26 |
| 753,443 | A | * | 3/1904 | St. Hilaire | ................ E05D 3/12 16/350 |

(Continued)

FOREIGN PATENT DOCUMENTS

| CN | 204395431 U | 6/2015 |
| DE | 19828746 A1 | 12/1999 |

(Continued)

OTHER PUBLICATIONS

International Search Report of PCT/IL2016/050755 Completed Sep. 20, 2016; dated Sep. 22, 2016 3 Pages.
(Continued)

*Primary Examiner* — Daniel J Wiley
(74) *Attorney, Agent, or Firm* — The Roy Gross Law Firm, LLC; Roy Gross

(57) ABSTRACT

A rotatable joint, comprising: at least three bar connectors; an axis piece comprising a central pivot and at least one of the at least three bar connectors longitudinally aligned with the central pivot; and two rotatable joint pieces each comprising a bushing and at least one of the at least three bar connectors oriented along the diameter of the bushing and aligned along the axis of symmetry of the bushing, wherein the bushing of each of the two rotatable joints pieces is configured to slide over the central pivot thereby coupling the two bushings with the central pivot and allowing the rotatable joint pieces to rotate about the central pivot, and
(Continued)

orient the bar connectors of the rotatable joint pieces perpendicular to the bar connector of the axis piece.

17 Claims, 15 Drawing Sheets

(51) Int. Cl.
*A63H 33/10* (2006.01)
*F16B 7/04* (2006.01)
*F16B 21/02* (2006.01)

(52) U.S. Cl.
CPC ............ *F16B 7/042* (2013.01); *F16B 7/0473* (2013.01); *F16C 11/0685* (2013.01); *F16C 11/10* (2013.01); *F16B 21/02* (2013.01)

(56) References Cited

U.S. PATENT DOCUMENTS

| | | | | |
|---|---|---|---|---|
| 4,030,161 A * | 6/1977 | Loikitz | ............... | E05F 1/063 16/284 |
| 4,037,978 A | 7/1977 | Connelly | | |
| 4,078,328 A | 3/1978 | Rayment | | |
| 4,692,963 A * | 9/1987 | Barroero | ............... | E05F 1/1223 16/275 |
| 4,697,306 A * | 10/1987 | Rhodes | ............... | E05F 1/063 16/317 |
| 5,600,870 A * | 2/1997 | Fields | ............... | A61F 9/025 16/342 |
| 5,993,287 A * | 11/1999 | Melashenko | ......... | E04H 15/008 160/135 |
| 6,059,268 A * | 5/2000 | Santelli, Jr. | .......... | A47D 13/043 256/1 |
| 6,161,334 A * | 12/2000 | Goodin | ................. | A01K 1/035 49/125 |
| 6,302,382 B2 * | 10/2001 | Santelli, Jr. | .......... | A47D 13/043 16/386 |
| 7,413,159 B2 * | 8/2008 | Liang | ................... | F16M 11/10 248/146 |
| 7,516,935 B2 * | 4/2009 | Liang | ................... | F16M 11/10 248/146 |
| 7,887,029 B2 * | 2/2011 | Flannery | ................. | E06B 9/06 256/73 |
| 2004/0025294 A1 * | 2/2004 | Gruber | ................. | E05D 7/1044 16/254 |
| 2007/0210293 A1 * | 9/2007 | Cheng | ................... | E04H 17/18 256/26 |
| 2014/0206227 A1 | 7/2014 | Kern | | |

FOREIGN PATENT DOCUMENTS

| | | |
|---|---|---|
| DE | 202004017445 U1 | 1/2005 |
| WO | 9400699 A1 | 1/1994 |

OTHER PUBLICATIONS

Written Opinion of PCT/IL2016/050755 Completed Sep. 20, 2016; dated Sep. 22, 2016 6 Pages.

* cited by examiner

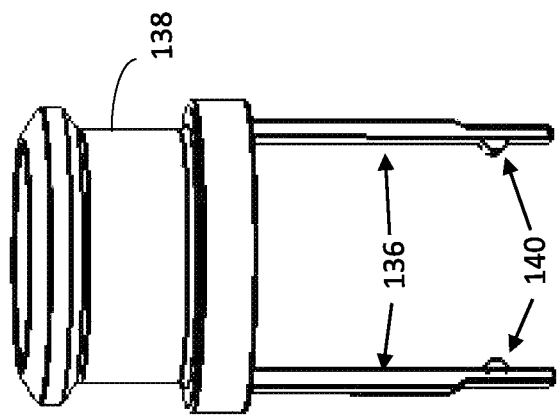
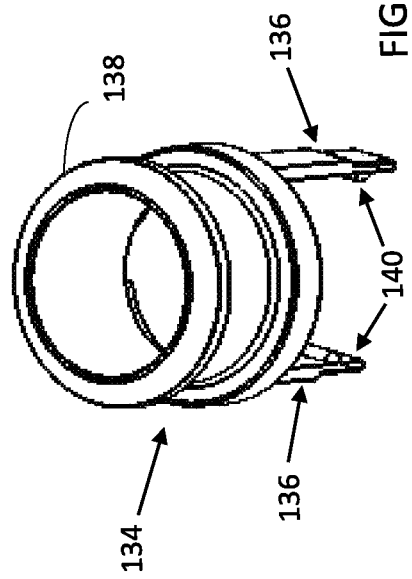
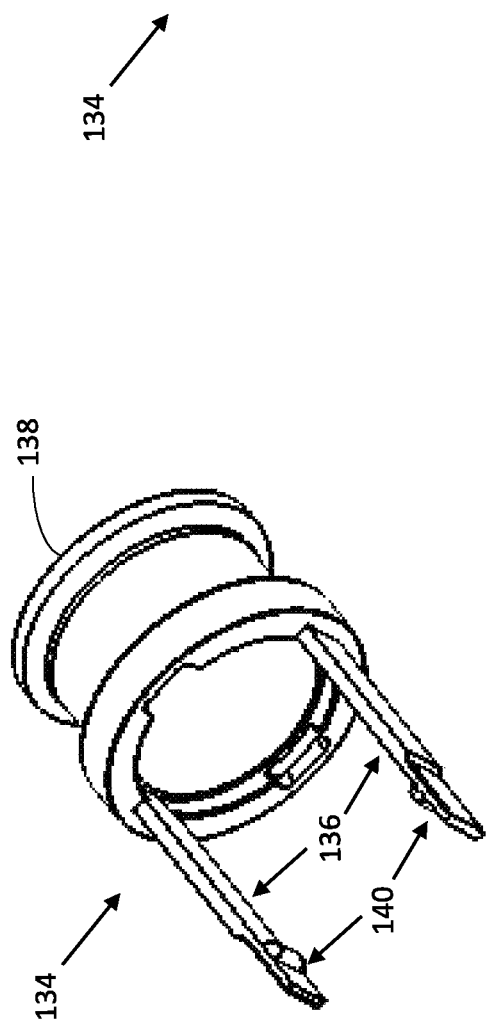

MODULAR ROTATABLE CONNECTING JOINT

CROSS-REFERENCE TO RELATED APPLICATIONS

This application is a National Phase of PCT Patent Application No. PCT/IL2016/050755 having International filing date of Jul. 13, 2016, which claims the benefit of priority of U.S. Provisional Patent Application No. 62/191,686, filed Jul. 13, 2015 and entitled "Modular Rotatable Connecting Joint". The contents of the above applications are all incorporated by reference as if fully set forth herein in their entirety.

FIELD OF THE INVENTION

The invention relates to the field of connectable joints for assembling modular systems.

BACKGROUND

Rotatable joints include a central pivoting body that allows for rotation of any connected parts. Such joints may include ball and socket joints, saddle joints, condyloid joints, and hinge joints, to name a few. Some rotatable joints allow a wide range of rotation, such as ball and socket joints. Other joints are designed to restrict rotation about one plane, or over a limited angular distance.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a rotatable joint, comprising: at least three bar connectors; an axis piece comprising a central pivot and at least one of the at least three bar connectors longitudinally aligned with the central pivot; and two rotatable joint pieces each comprising a bushing and at least one of the at least three bar connectors oriented along the diameter of the bushing and aligned along the axis of symmetry of the bushing, wherein the bushing of each of the two rotatable joints pieces is configured to slide over the central pivot thereby coupling the two bushings with the central pivot and allowing the rotatable joint pieces to rotate about the central pivot, and orient the bar connectors of the rotatable joint pieces perpendicular to the bar connector of the axis piece.

In some embodiments, the axis piece further comprises a second bar connector that is oppositely aligned with the bar connector of the axis piece.

There is provided, in accordance with an embodiment, a rotatable joint, comprising: at least two bar connectors; an axis piece comprising a central pivot; and two rotatable joint pieces each comprising a bushing and at least one of the at least two bar connectors oriented along the diameter of the bushing and aligned along the axis of symmetry of the bushing, wherein the bushing of each of the two rotatable joints pieces is configured to slide over the central pivot thereby coupling the two bushings with the central pivot and allowing the rotatable joint pieces to rotate about the central pivot, and orient the bar connectors of the rotatable joint pieces perpendicular to the central pivot.

In some embodiments, one of the rotatable joint pieces further comprises a second bar connector.

In some embodiments, the second bar connector is oppositely aligned with the bar connector of the one rotatable joint piece.

There is provided, in accordance with an embodiment, a rotatable joint, comprising: at least two connectors comprising two bushings connected by a bar; and an axis piece comprising a central pivot, wherein the bushing of each of the two connectors is configured to be positioned over the central pivot thereby coupling the two bushings with the central pivot and allowing the connectors to rotate about the central pivot, and orient the connected bars perpendicular to the central pivot.

In some embodiments, the axis piece further comprises a safety cap disposed on the base of the central pivot opposite to the bar connector.

In some embodiments, the central pivot is disposed with one or more rectangular keys and wherein each bushing is disposed with one or more keyways corresponding the one or more rectangular keys.

In some embodiments, the rotatable joint further comprises a lock comprising at least one prong, wherein the inner surface of a first one of the two bushings is disposed with a first additional keyway positioned to align with at least one of the keyways of the second one of the two bushings and form a continuous groove along the inner surface of the rotatable joint, when the bar connectors of each of the two rotatable joint pieces are oriented at an angle of a polygon, wherein the prong is configured to be inserted into the continuous groove formed by the aligned keyways of the two bushings and prevent the rotation of the two bushings about the pivot, thereby locking the rotatable joint, and wherein the prong is configured to be removed from the keyway of at one of the bushings and allow the rotation of the two bushings about the pivot, thereby unlocking the rotatable joint.

In some embodiments, the lock comprises two prongs connected by a connecting piece, and wherein the inner surface of the first one of the two bushings is disposed with a second additional keyway, wherein, when the bar connectors of each of the two rotatable joint pieces are oriented at the angle of the polygon, the first and second additional keyways of the first one of the two bushings are configured to align with two keyways of the second one of the two bushings thereby forming two continuous grooves along the inner surface of the rotatable joint, wherein the prongs are configured to be inserted into the two continuous grooves formed by the aligned keyways of the two bushings and lock the rotatable joint, and wherein the prongs are configured to be removed from the two keyways of at least one of the bushings and allow the rotation of the two bushings about the pivot, thereby unlocking the rotatable joint.

In some embodiments, the angle is substantially orthogonal.

In some embodiments, the connecting piece is configured to fit over a bar configured to attach to the bar connector of the central pivot, wherein locking the rotatable joint comprises sliding the connecting piece along the bar towards to rotatable joint and pushing the prongs into the continuous grooves formed by the aligned keyways of the two bushings, and wherein unlocking the rotatable joint comprises sliding the connecting piece along the bar away from the rotatable joint and pulling the prongs out of the keyways of at least one of the bushings.

In some embodiments, each prong is disposed with a bump that prevents fully detaching from the rotatable joint when unlocking.

In some embodiments, the central pivot is disposed with a flange, wherein the flange is configured to secure the two bushings when coupled with the central pivot.

In some embodiments, the bar connector comprises a spring, the spring comprising: a distal flat tab; a proximal flat tab; a substantially diagonal bridge connecting the distal flat tab and the proximal flat tab; and a button-like piece located on the proximal tab, wherein the proximal flat tab or the distal flat tab connect to a shaft of the bar connector and are flush with a face of the shaft, and the distal tab or the proximal tab, respectively, does not connect to the shaft and is flush with another face of the shaft.

In some embodiments, the spring further comprises a second button-like piece located on the distal tab.

In some embodiments, the button-like piece has a gradient in at least a proximal or a distal face.

In some embodiments, the second button-like piece has a gradient in at least a proximal or a distal face.

In some embodiments, the distal flat tab and the proximal flat tab are parallel to each other.

In some embodiments, the spring further comprises one or more bars comprising a hole corresponding to the button-like piece, wherein button-like piece is configured to pop out of the corresponding hole when the bar couples with the bar connector.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIGS. 6A-6D show a securing mechanism for securing a rotatable joint in accordance with an embodiment;

DETAILED DESCRIPTION

A system for a modular rotatable joint is described herein. The modular joints each comprise a central axis, or pivot, and multiple multi-directional bar connectors such that any bars connected orthogonally to the axis are free to rotate about the axis. A modular three-dimensional structure may be assembled by interconnecting the bars to pairs of the rotatable joints via the bar connectors. Thus assembled, the modular structure may be quickly and easily collapsed without disconnecting any of the bars from the joints by merely rotating any bars oriented perpendicular to the pivots until they lie on the same plane.

Figure 1A:
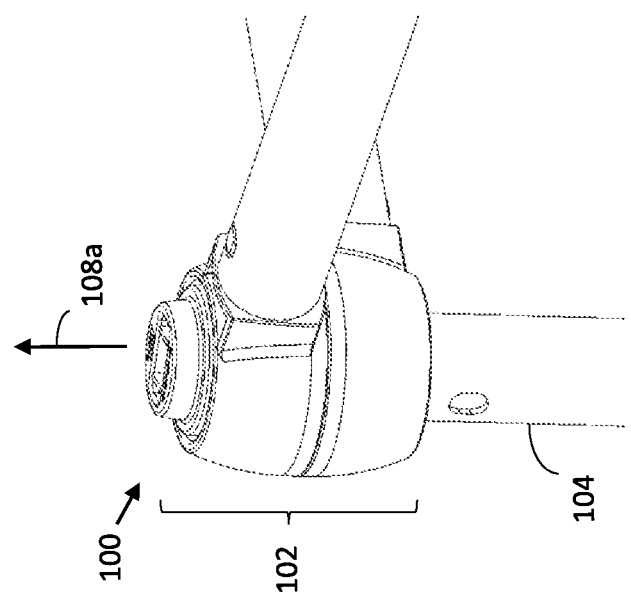
FIG. 1A illustrates a rotatable joint connected to multiple bars, in accordance with an embodiment.

Reference is now made to FIG. 1A which illustrates a modular apparatus 100 comprising a rotatable joint 102 connected to multiple bars 104, in accordance with an embodiment. Although FIG. 1A shows apparatus 100 comprising one joint 102 connected to three bars 104, it may be understood that any number of joints 102 may be used to interconnect any number of bars 104 and that bars 104 may connect to any two of joints 102 to assemble one or more interconnected three-dimensional frames. In one embodiment, joint 102 connects from between three to six bars, to allow the assembly of a modular cubic structure, comprised of multiple interconnected cubic frames. Rotatable joint 102 includes a central axis, or pivot 106 (not shown) having a round cross-section that allows any of bars 104 connected orthogonally to pivot 106 to rotate about pivot 106, the mechanism of which will be described in greater detail below. Apparatus 100 may be assembled with any number of pivots 106 of any number of joints 102 longitudinally aligned along the same axis (108a), allowing any of bars 104 connected in an orthogonal orientation with respect to the aligned pivots 106 to freely rotate about pivots 106, such as until they mutually align along an axis perpendicular to pivots 106 to span substantially one plane.

It may be noted that the vertical orientation of axis 108a is for illustrative purposes only, and pivots 106 may be mutually aligned in any direction. Thus aligned, the bars 104 and joints 102 comprising apparatus 100 may be collapsed to substantially one plane while remaining assembled, and maintaining their connectivity.

Bars 104 may have a length ranging from 10 centimeters to 50 centimeters, and may have a cross-section ranging from 0.5 centimeter to 15 centimeters. Bars 104 may have a substantially round cross-section, alternatively, bars 104 may have a square, or rounded square cross-section, alternatively bars 104 may have a hexagonal or octagonal cross-section, or any other suitable geometry for connecting to joints 102.

Joint 102 may have a height ranging from 4 centimeters to 20 centimeters, and a diameter ranging from 1 centimeters to 20 centimeters. However these sizes are exemplary only, and joint 102 may be larger or smaller. Joint 102 may be substantially oval in shape, alternatively joint 102 may be substantially spherical, cubic, or have any suitable external geometry that allows for convenient manufacturing and provides a safe, smooth external surface.

Figure 1B:
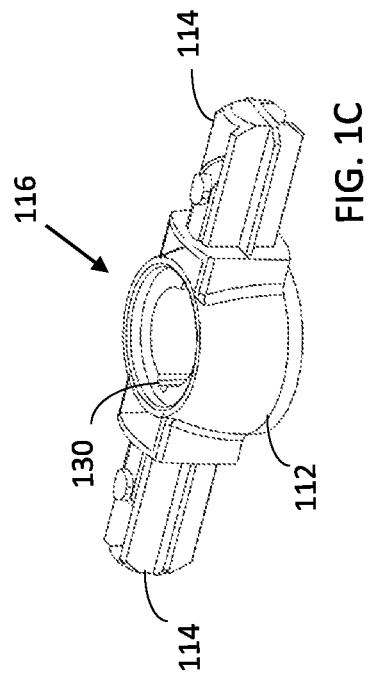
FIGS. 1B-E illustrate multiple pieces comprising a rotatable joint, in accordance with an embodiment.

Joint 102 may be assembled from three separate pieces, each having at least one bar connector, the details of which now follow:

Reference is now made to FIGS. 1B-E which together are a detailed illustration of multiple pieces comprising rotatable joint 102, in accordance with an embodiment. Referring to FIG. 1B, a single-connection rotatable joint piece 110 is integrally formed from a bushing 112 and a bar connector 114 oriented along the diameter of bushing 112 and aligned along the axis of symmetry of bushing 112. Bushing 112 is provided with one or more grooves, or keyways 130 running along the height of the inner surface of bushing 112. Optionally, two keyways 130 may be symmetrically positioned on opposite sides of the inner surface of bushing 112, at 180° from each other.

Figure 1C:
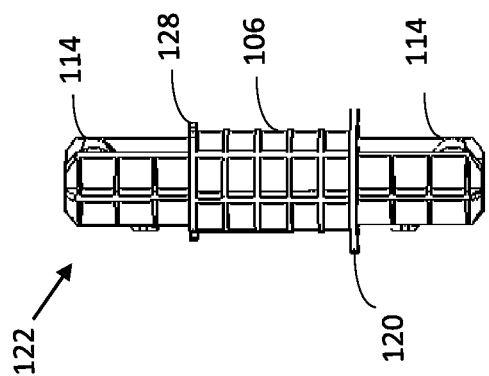

Referring to FIG. 1C, a dual-connection rotatable joint piece 116 is integrally formed from bushing 112 and two single bar connectors 114. In one embodiment, the two single bar connectors 114 are oppositely aligned, oriented at a 180 degree angle to each other along the diameter of bushing 112 and aligned along the axis of symmetry of bushing 112.

Figure 1D:
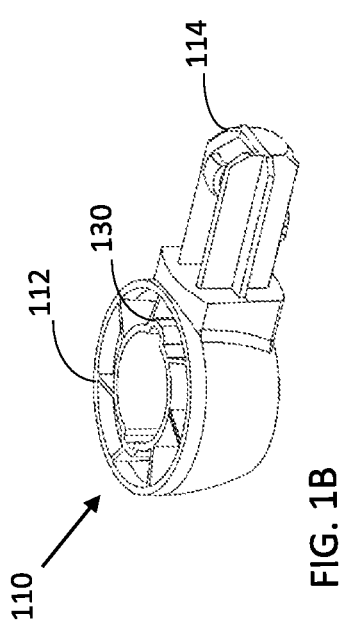

Referring to FIG. 1D, an elongated single-connection axis piece 118 is integrally formed from pivot 106, bar connector 114 longitudinally oriented with pivot 106 and optionally, a flange 120 positioned between pivot 106 and bar connector 114. The base of pivot 106, positioned opposite to bar connector 114, may be disposed with a connector 124 that locks onto a safety cap 126. For example, connector 124 may comprise a plug, and safety cap 126 may comprise a socket that form a safety lock, securing cap 126 onto one end of pivot 106. Alternatively, safety cap 126 may be integrally formed with axis piece 118. Alternatively, the base of pivot 106 may comprise a supportive base (not shown), such as for distributing any stress applied to axis piece 118 when axis piece is oriented vertically and positioned at the bottom of apparatus 100. One or more rectangular keys 128 that match keyways 130 of bushing 112 may be provided at the base of pivot 106 opposite bar connector 114.

Flange 120 may uniformly distribute any weight or force applied longitudinally along axis piece 118 to prevent the stress from being applied to longitudinally connected bars 104 and/or bar connectors 114. For example, when axis pieces 118 or 122 are aligned vertically and interconnected with bars 104, such as when used for a climbing structure, flange 120 carries the gravitational weight applied on the structure, and thus distributes the resulting stress away from bars 104 and bar connectors 114, and onto flange 120 instead.

Figure 1E:
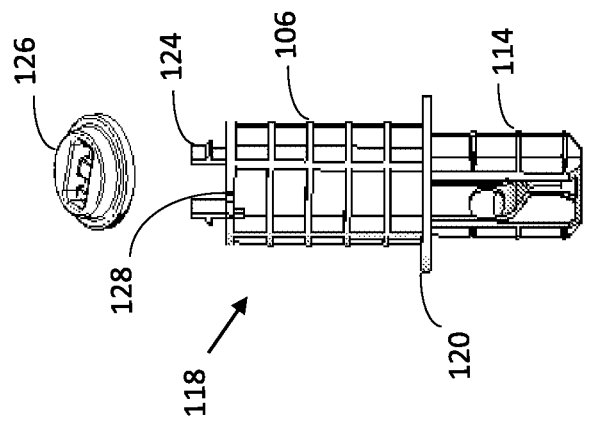

Referring to FIG. 1E, an elongated dual-connection axis piece 122 is integrally formed from pivot 106, and two oppositely aligned bar connectors 114 each longitudinally oriented with, and extending from opposite ends of pivot 106, flange 120 may be positioned at one end of pivot 106 between one of bar connectors 114 and pivot 106, and rectangular keys 128 may be disposed at the other end of pivot 106 between one of bar connectors 114 and pivot 106.

It may be noted that bar connector 114 may comprise any suitable mechanism for securing any of bars 104 to any of joint pieces 110, 116, 118, and/or 122. Although the drawings illustrate an elongated bar connection configured to be inserting inside a hollow bar and securing via a spring, which will be described in greater detail below, in other non-limiting embodiments, bar connection 114 may be hollow to allow inserting bars 104 into bar connector 114, and may be alternatively connected via a cam and groove, matched male/female threads, or any other suitable connecting mechanism.

The length of pivot 106 between flange 120 and keys 128 may correspond to the combined height of two of bushings 112 to allow positioning any two of rotatable joint pieces 116 or 110 on pivot 106 and secured on either side by flange 120 and keys 128. Alternatively, the length of pivot 106 may allow positioning more than two of any of rotatable joint pieces 116 or 110 on pivot 106 and secured on either side by flange 120 and keys 128. Rotatable joint piece 116 and/or rotatable joint piece 110 may be positioned onto pivot 106 by radially aligning keyways 130 of bushing 112 with keys 128 of pivot 106 and sliding bushing 112 over pivot 106. Once positioned on pivot 106 and secured on either side by flange 120 and keys 128, rotatable joint piece 116 and/or rotatable joint piece 110 may freely and independently rotate about pivot 106.

Bushings 112 may have an external diameter 112a ranging from 1 cm to 20 cm, and an internal diameter 112b ranging from 0.5 cm to 15 cm. The height of bushing 112 may range from 1 cm to 10 cm. The length of pivot 106 may accommodate twice the height of bushing 112 with additional clearance to allow bushing 112 to rotate about pivot 106 while secured between flange 120 and keys 128, and may range from 4 cm to 20 cm. The diameter of pivot 106 corresponds to the internal diameter 112b of bushing 112, with additional clearance to allow bushings 112 to easily rotate about pivot 106 without wobbling, and may range from approximately 0.5 cm to 15 cm. Keys 128 and keyways 130 may be sized to range between the internal and external diameters 112a and 112b of bushing 112. Alternatively, any of bushings 112, pivot 106 and their features such as keys 128 and keyways 130 may be larger or smaller than the dimensions listed above.

Figure 1F:
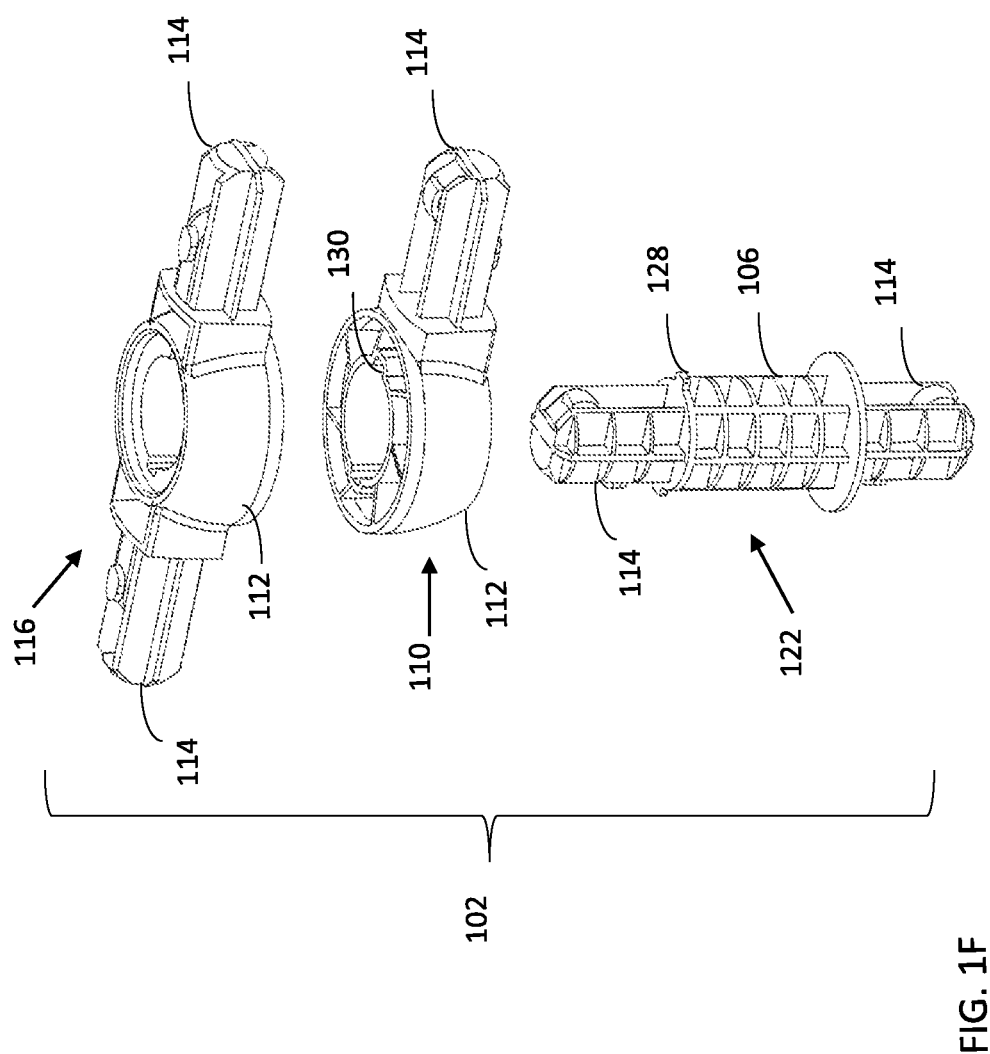
FIG. 1F shows an exploded view of a rotatable joint, in accordance with an embodiment.

Rotatable joints 102 may have at least three bar connectors 114 and may be assembled from any two of rotatable joint pieces 110 and/or 116 with any one of axis piece 118 or 122 as follows:

Reference is now made to FIG. 1F which shows an exploded view of exemplary configuration for a rotatable joint 102c having five bar connectors 114, in accordance with an embodiment. In this exemplary configuration, joint 102 is assembled from joint pieces 110, and 116 and dual-connection axis piece 122. However, other configurations for a five-way rotatable joint 102c may be assembled from pieces 110, 116, 118, and/or 122. For example a five way joint may be assembled from a single-connection axis piece 118 coupled to two dual-connection rotatable joint pieces 116. Keyways 130 of both bushings 112 of joint pieces 110 and 116 may be radially aligned with keys 128 of pivot 106 of axis piece 122, to allow sliding bushings 112 over pivot 106 to couple both bushings 112 with pivot 106. Thus coupled, bar connectors 114 of joint pieces 110, and 116 are oriented perpendicular to bar connectors 114 of axis piece 122. The clearance between bushings 112 and pivot 106 allow bushings 112 to freely rotate about pivot 106, spanning 360° range of motion. Thus, in one orientation bar connector 114 of joint piece 110 may form a 90° angle with bar connectors 114 of joint piece 116, thereby orienting the bar connectors 114 of each of pieces 110 to 116 and 122 to lie orthogonally to each other such as to form a cubic frame by connecting bars 104 to bar connectors 114. In another orientation, rotating bushings 112 about pivot 106 aligns bar connectors 114 of joint pieces 110 and 116 along a common axis that is orthogonal to bar connector 114 of axis piece 122, such as to allow collapsing assembly 100 to substantially one plane.

Optionally, the exterior of bushings 112 may have a tapered convex shape, such that stacking any two of joint pieces 110 and 116 over pivot 106 results in a smooth, rounded surface formed by both bushings 112 of joint pieces 110 and 116, providing a safe, smooth surface.

In a similar manner, different combinations of joint pieces 110, 116, 118, and 122 may be assembled to form multiple different configurations for rotatable joints 102 having from between three and six orthogonally oriented bar connectors 104 to allowing the assembly of any number and/or arrangement of connected cubes that may forming apparatus 100. In particular, any two of rotatable joint pieces 110 and 116 may be coupled to any one of axis pieces 118 and 122. Although joint pieces 110 and 116 are shown having between one and two bar connectors 114, they may comprise any number of bar connectors 114.

In another embodiment, rotatable joint pieces 110 and 116 have more than two bar connectors 114, such as three, four, or five bar connectors 114 positioned evenly or not evenly around bushing 112 allowing the formation of any polygon-shaped frame from joints 102 with bars 104.

In another embodiment, axis pieces 118 and/or 112 may be coupled with more than two bushings 112, allowing the assembly of joint 102 having more than two of rotatable joint pieces 110 and/or 116, and thus, any number of bars 114 radiating at any angle around axis piece 118.

Figure 1H:
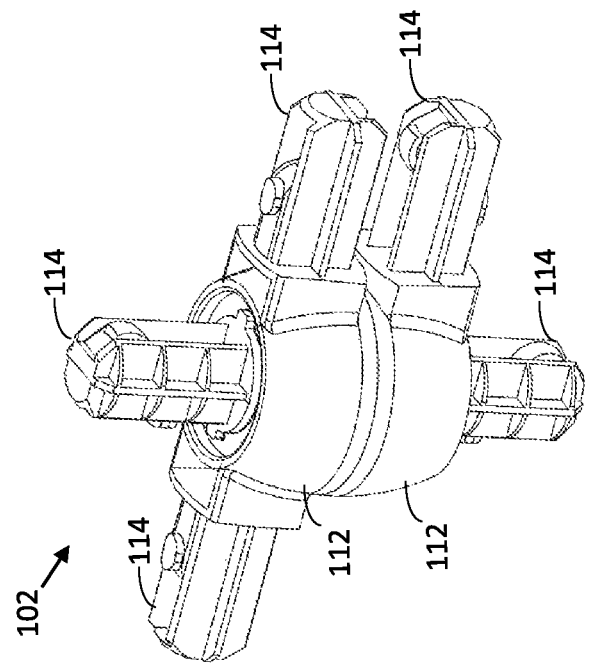
FIG. 1G-H, show an assembly for a rotatable joint having five bar connectors, in accordance with an embodiment.
Figure 1G:
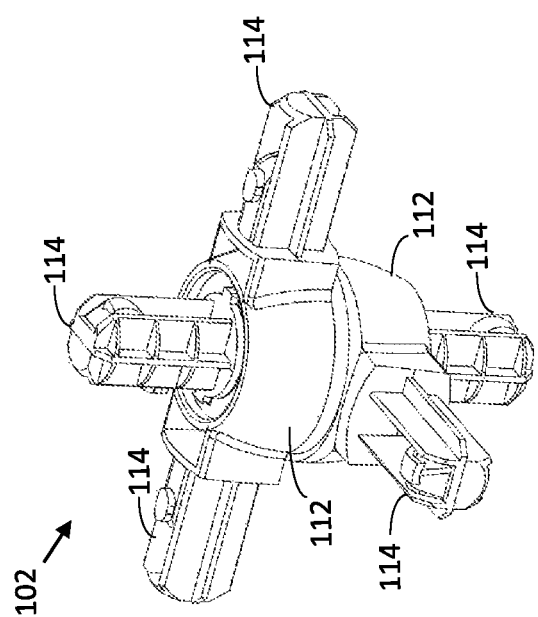

For example, referring to FIGS. 1G-H, an exemplary assembly for rotatable joint 102c having five bar connectors 114 is shown. In this non-limiting embodiment, rotatable joint 102c is assembled from a single-connection rotatable joint piece 110 and a dual-connection rotatable joint piece 116 coupled to dual-connection axis piece 118. However, any combination of joint pieces 110, 116, 118, and 122 that results in five bar connectors 114 may be similarly assembled to form rotatable joint 102c, as described above. Pivot 106 (not shown) of dual-connection axis piece 122 is fitted through each of bushings 112 of rotatable joint pieces 110 and 116 by radially aligning keys 128 of pivot 106 with keyways 130 of bushings 112 and sliding bar connector 114 through joint pieces 110 and 116 until they both fit in between flange 120 (not shown) and keys 128 of axis piece 118. Thus fitted, rotatable joint pieces 110 and 116 may be longitudinally secured between keys 128 and flange 120 and free to rotate about pivot 106, in particular, rotatable joint pieces may be oriented such that their respective bar connectors 114 lie orthogonal to each other (FIG. 1G), such as to form any number of inter connectable orthogonal frames via multiple connected bars 104, alternatively, rotatable joint pieces may be oriented such that their respective bar connectors 114 lie on the same axis to collapse apparatus 100 along one plane (FIG. 1H).

In addition to flange 120 and/or keys 128, the assembly of any of joint pieces 110 and 116 over dual-connection axis piece 122 may be secured by connecting a bar 104 to each of bar connectors 114 disposed at either end of axis piece 122.

In a similar manner, pivot 106 of single-connection axis piece 118 may be fitted through bushings 112 of any two of rotatable joint pieces 110 and 116 by radially aligning keys 128 of pivot 106 with keyways 130 of bushings 112 and sliding bar connector 114 through joint pieces 110 and 116 until they both fit in and are secured between flange 120 and keys 128 of axis piece 118. The assembly of any of joint pieces 110 and 116 over single-connection axis piece 118 may be longitudinally secured by connecting a bar 104 to bar connector 114 disposed at one end of axis piece 118, and by engaging cap 126 with connectors 124 at the other end of axis 118 piece.

The geometry of any of joints and/or bars may be designed to accommodate injection molding, thus the dimensions of the various parts may be designed to have a uniform density along a given axis.

Bars 104 and joints 102 comprising assembly 100 may be manufactured of the same material. Such material may be selected from, but is not limited to any of the following: ABS, ABS with Glass Fiber, ABS/PC, ABS/PC with Glass Fiber, Acetal, Acetal with Glass Fiber, Acrylic (PMMA), Acrylic (PMMA) with Glass Fiber, ETPU, ETPU with Glass Fiber, HDPE, HDPE with Glass Fiber, LCP, LCP with Glass Fiber, LDPE, LDPE with Glass Fiber, LLDPE, LLDPE with Glass Fiber, Magnesium, MIM Nickel Steel, MIM Stainless Steel, Nylon, Nylon with Glass Fiber, PBT, PBT with Glass Fiber, PC, PC with Glass Fiber, PC/PBT, PC/PBT with Glass Fiber, PEEK, PEEK with Glass Fiber, PEI, PEI with Glass Fiber, PP (Polypropylene), PP with Glass Fiber, PPS, PPS with Glass Fiber, PPSU, PPSU with Glass Fiber, Aluminum, Copper, Iron, Nickel, Platinum, Silver, Tin, Zinc, Brass, Bronze, Steel, Chromoly, Stainless Steel, Tool Steel, Titanium, Any Combination of Alloy, SB, SB with Glass Fiber, Silicone, Silicone with Glass Fiber, TPE, TPE with Glass Fiber, TPU-Polyester, TPU-Polyester with Glass Fiber, TPV, TPV with Glass Fiber, or any other similar material.

Bar connectors 114 may comprise any suitable mechanism to connect bars 104 to rotatable joints 102, such as by fitting bars 104 and bar connectors 114 of rotatable joints 102 with complementary parts to form a spring lock, screw mechanism, or other.

In one embodiment, the rotatable joint may connect bars to form one or more interconnected two-dimensional frames that may be collapsed to substantially one dimension. This embodiment is substantially similar to the joint described above with the notable different that the axis piece comprises a central pivot, but no bar connectors, and thus, provides no substantial height to the apparatus. The joint includes at least two rotatable joint pieces and an axis piece. The axis piece includes a central pivot. Each of the rotatable joint pieces includes a bushing and at least one bar connector oriented along the diameter of the bushing and aligned with the axis of symmetry of the bushing, as described above. The bushings of each of the two rotatable joints pieces are configured to slide over the central pivot, thereby coupling the two bushings with the central pivot and allowing the rotatable joint pieces to rotate about the central pivot, and orient the bar connectors of the rotatable joint pieces perpendicular to the central pivot.

Figure 2B:
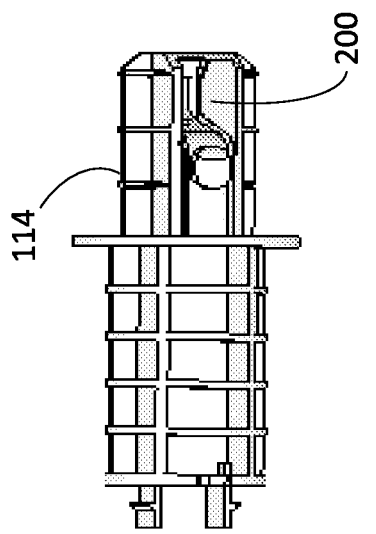
FIGS. 2A-C illustrates a mechanism to connect a bar with any of the rotatable the joints of FIGS. 1A-H, in accordance with an embodiment.
Figure 2C:
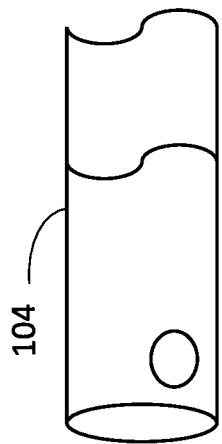
Figure 2A:
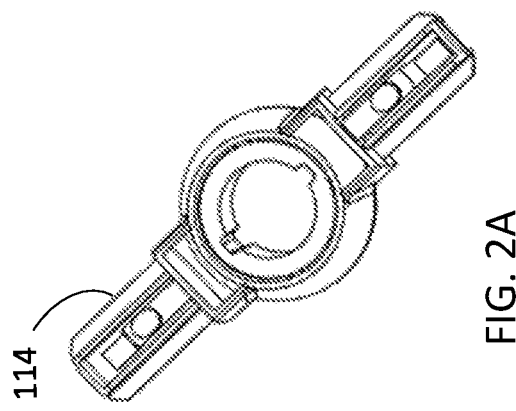

Reference is now made to FIGS. 2A-C which illustrates a connecting mechanism for any of bars 104 with bar connectors 114 of rotatable joints 104, in accordance with an embodiment. Bar connectors 114 may be disposed with a substantially S-shaped spring leaf 200 that engages with the interior of hollow bar 104 via one or more buttons 220 and/or 224. Spring leaf 200 may exert a force on the inner wall of hollow bar 104, and the one or more buttons 220 and/or 224 may lock into one or more holes 104a provided at the end of bar 104, the details of which now follow:

In some embodiments, the connector comprises one or more protruding rods, each of which may be used for connecting one bar to the connector. Each such protruding rod may have thereon a leaf spring connected at one end to the protruding rod. The leaf-spring is substantially S-shaped, e.g., it may comprise two substantially flat tabs each flushed with an opposite face of the protruding rod, or touching opposing internal faces of the bar into which the protruding rod is inserted, wherein the flat tabs are connected by a substantially diagonal bridge. The two flat tabs may be parallel to each other. At least the tab near the connection to the protruding rod, and optionally both tabs, may have a protruding button for engaging with corresponding holes provided on the bar to be connected, to lock the spring, and therefore the joint, inside the bar. In one embodiment, only the tab near the connection to the protruding rod has such a protruding button. One of the tabs, e.g. the proximal tab may be attached to the protruding rod, while the other tab which is inserted farther into the bar, is not connected. However, as mentioned above, the two tabs are aligned with opposing faces of the protruding rod, and therefore are aligned with or at least touch opposing sides or areas of the inner surface of a bar into which the protruding rod is inserted. It will be appreciated that although the term opposing faces may relate to a bar or rod having rectangular cross section, it may also relate to areas around the two ends of a radius of a round bar or rod, or any other two areas far from each other, depending on the cross section of the rod or bar.

Thus, when stress is applied at the button located on the tab closer to where the leaf spring connects to the protruding rod in order to release the spring, the stress is transferred to the diagonal bridge and therefrom to the inner surface of the bar upon which it leans, thus preventing breakage even under extreme stress. Once compressed, the button or buttons disengage from the holes of the bar, unlocking the joint.

While connecting a bar to the connector, the protruding rod is inserted into the tube at the distal end until the tube presses on both tabs and compresses the spring. At the beginning of the insertion, the button at the unattached end is slightly depressed into the rod and the button at the proximal end is slightly expressed from the rod. Alternatively, if no button is disposed at the unattached end, the unattached tab is depressed into the rod. When insertion continues, the button at the proximal end is slightly depressed as well. This positions the buttons for engaging with the holes of the tube, releasing the spring and locking the rod inside the tube.

In order to release the bar, both buttons are to be pressed simultaneously, thus compressing the spring, without actuating force on the connection of the spring leaf to the protruding rod. Alternatively, if only one button is disposed on the spring, one button is pressed to compress the spring. The freely moving unattached tab thus provides the spring with flexibility for easy locking and unlocking. However, the motion at the attached tab is constrained by the tube and the pressure applied to unlock the spring is transferred to the diagonal bridge and to the bar surface, thus alleviating stress that could break the attached tab from the rod.

Once compressed, the button or buttons disengage from the hole or holes of the bar, unlocking the spring, such that the rod can slip out of the tube.

Figure 2D:
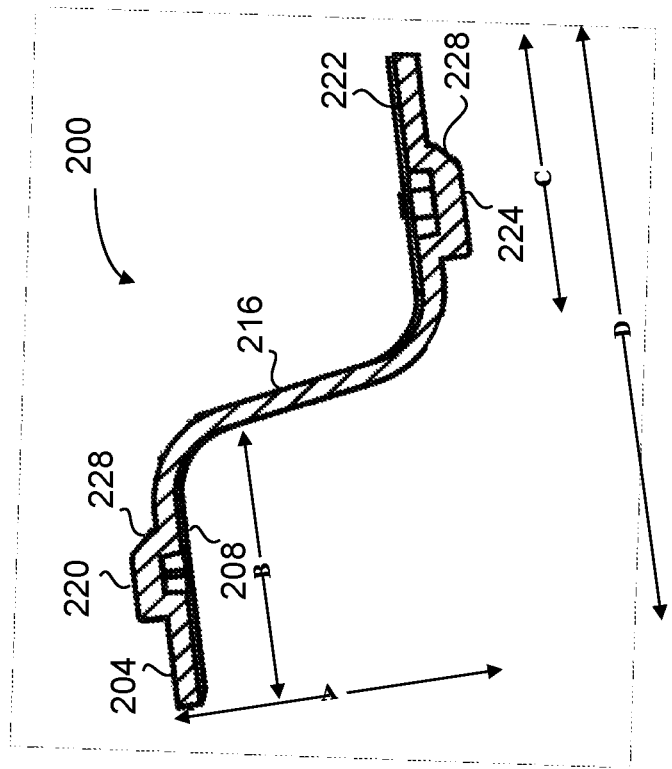
FIG. 2D shows a schematic perspective view of a leaf spring, in accordance with an embodiment.

Referring now to FIG. 2D showing a schematic perspective view of leaf spring 200. Leaf spring 200 connects at proximal end 204 to a protruding shaft of the connector, such as bar connector 114. The leaf spring comprises flat proximal tab 208 and flat distal tab 222, connected by substantially diagonal bridge 216. Proximal tab 208 comprises protruding button 220, and distal tab 222 optionally comprise protruding button 224.

In order to demonstrate proportion requirements, the height (or diameter, or similar measure, depending on the cross section) of the protruding rod is indicated A. Depending on the diameter or another dimension of the cross section of the bar it is required to connect, A may vary, for example, between 5 mm and 500 mm. It will be appreciated that length B of proximal tab 208 and length C of distal tab 222 may be between a fraction of A and a multiplicity of A, for example between 0.1*A and 3*A. The length of projection D of the spring leaf has to be larger than B+C, and depends on the angles between bridge 216 and tabs 208 and 222. Each angle may be anywhere between 90° and 280°, for example, between 145° and 160°.

The spring leaf may be manufactured of the same material as the protruding rod, or form a material that may be connected to the material of the rod. Such material may be selected from, but is not limited to any of the following: ABS, ABS with Glass Fiber, ABS/PC, ABS/PC with Glass Fiber, Acetal, Acetal with Glass Fiber, Acrylic (PMMA), Acrylic (PMMA) with Glass Fiber, ETPU, ETPU with Glass Fiber, HDPE, HDPE with Glass Fiber, LCP, LCP with Glass Fiber, LDPE, LDPE with Glass Fiber, LLDPE, LLDPE with Glass Fiber, Magnesium, MIM Nickel Steel, MIM Stainless Steel, Nylon, Nylon with Glass Fiber, PBT, PBT with Glass Fiber, PC, PC with Glass Fiber, PC/PBT, PC/PBT with Glass Fiber, PEEK, PEEK with Glass Fiber, PEI, PEI with Glass Fiber, PP (Polypropylene), PP with Glass Fiber, PPS, PPS with Glass Fiber, PPSU, PPSU with Glass Fiber, Aluminum, Copper, Iron, Nickel, Platinum, Silver, Tin, Zinc, Brass, Bronze, Steel, Chromoly, Stainless Steel, Tool Steel, Titanium, Any Combination of Alloy, SB, SB with Glass Fiber, Silicone, Silicone with Glass Fiber, TPE, TPE with Glass Fiber, TPU-Polyester, TPU-Polyester with Glass Fiber, TPV, TPV with Glass Fiber, or any other similar material.

It will be appreciated that each of buttons 220 or 224, instead of having a step-like cross-section, may comprise a gradient, such as a finger relief, 228 at its distal and/or proximal side, to enable easy connection or release.

Figure 3:
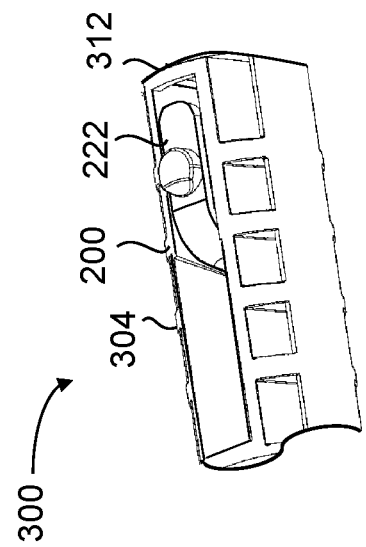
FIG. 3 shows a schematic perspective view of a connector with the spring leaf of FIG. 2D, in accordance with an embodiment.

Referring now to FIG. 3, showing a schematic perspective view of a connector with a spring leaf. The connector, generally referenced 300, corresponding to bar connector 114 above, comprises a protruding shaft 304 including spring leaf 200.

It can be seen that spring leaf 200 is connected to connector 300 at the connector proximal end, such that distal tab 222 at the other end of spring leaf 200 is unattached and is aligned with the distal end 312 of protruding shaft 304.

Figure 4:
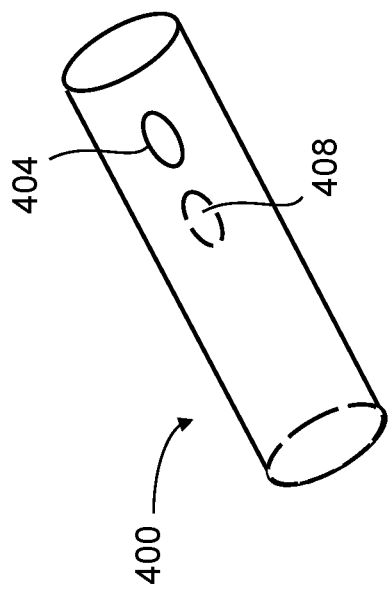
FIG. 4 shows a perspective view of a bar, in accordance with an embodiment.

Referring now to FIG. 4, showing a perspective view of a bar 400 corresponding to bar 104 above, to be connected using a connector with a spring leaf 200. The bar comprises two holes 404 and 408 on opposite sides of bar 400, into which protruding buttons 220 and 224 pop when the bar is connected.

In one embodiment, bar 400 is disposed only with one hole 404 corresponding to the proximally positioned button 220 of proximal tab 208.

Alternatively, spring leaf 200 may be attached at the distal end of bar connector 114 and unattached at the proximal end. As above spring leaf 200 may include one or more buttons to engage with a corresponding number of holes of bar 104.

Alternatively, spring leaf 200 is attached on either side to both the distal end and the proximal end of bar connector 114. As above, in this embodiment, spring leaf 200 may include one or more buttons to engage with a corresponding number of holes of bar 104.

It will be appreciated that the disclosure may be used with a bar having any required cross section, such as a circle, a square, a rectangle, a triangle, or any arbitrary cross section.

Figure 5A:
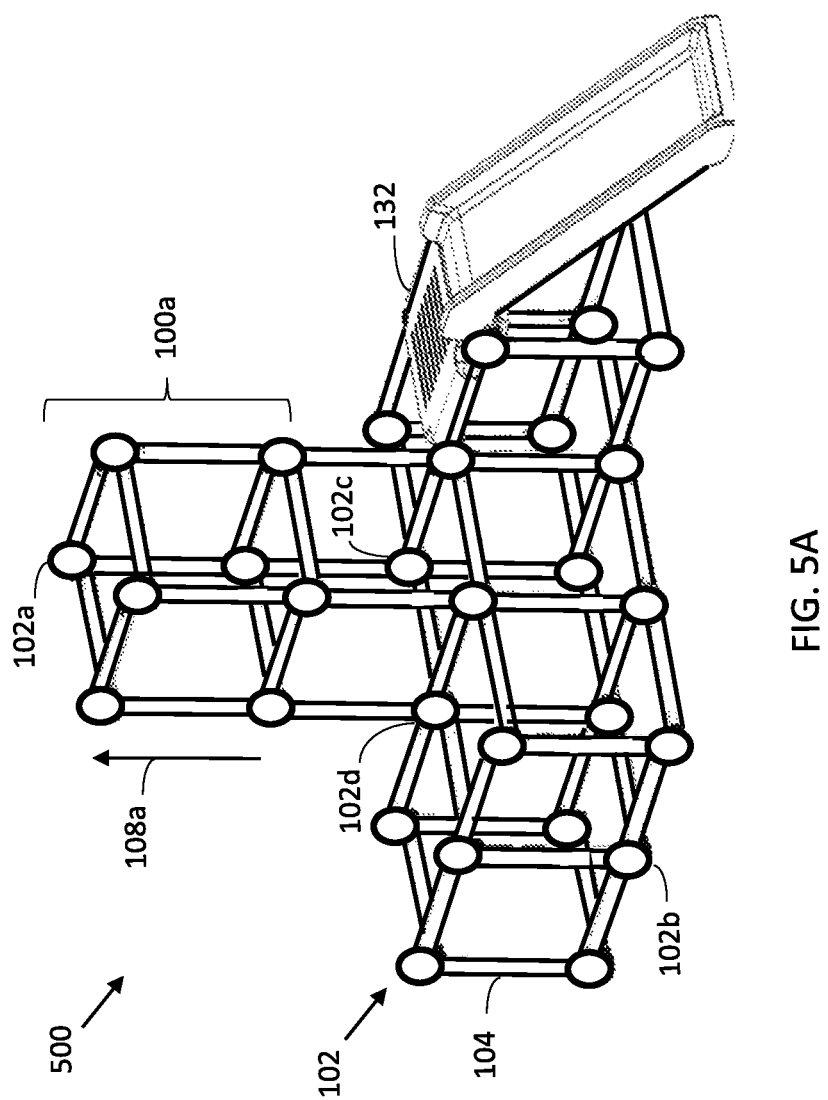
FIGS. 5A-D illustrate a modular collapsible jungle gym apparatus assembled using the rotatable joint of FIGS. 1A-H.

Reference is now made to FIGS. 5A-D which illustrates a modular collapsible jungle gym apparatus assembled using the rotatable joint described above, in accordance with an embodiment. Referring to FIG. 5A a jungle gym apparatus 500 is shown in an assembled open configuration. Apparatus 500 is assembled from multiple rotatable joints 102 connecting multiple bars 104 where the depth (108*c*) of apparatus 100 when collapsed is proportional and due primarily to the diameter of rotatable joints 102. A fixing element 132, such as a seat, slide or bracket, may be positioned in any square of any of cubes 100*a* to lock at least one orthogonal angle of any of the assembled cubes 100*a*, thereby preventing rotation of any of bars 104 about pivot 106 to stabilize apparatus 100 and prevent it from collapsing while in use. To fold or collapse apparatus 100, fixing element may be removed, allowing rotatable joints 102 to freely rotate about pivot 106 as described above.

Figure 5B:
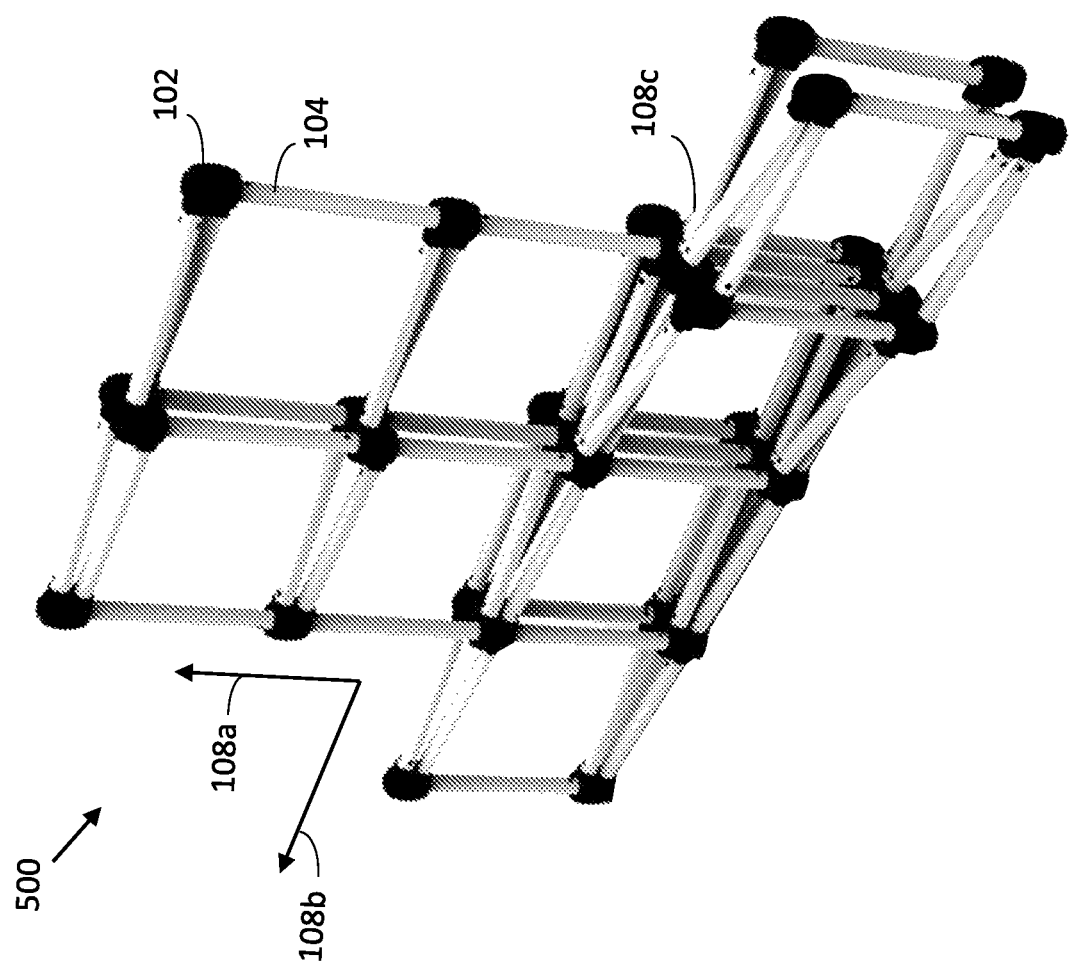
Figure 5D:
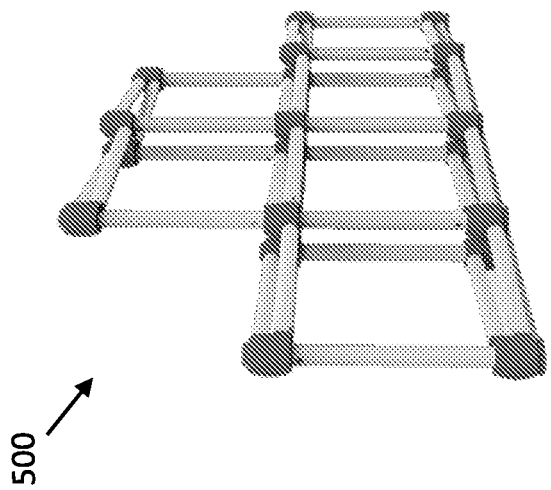
Figure 5C:
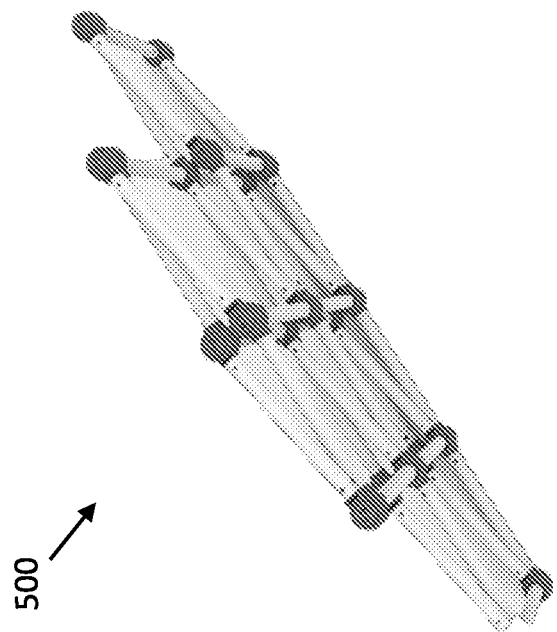

Reference is made to FIGS. 5B-D, which show apparatus 500 collapsed to substantially one plane. The thickness of the collapsed apparatus 500, indicated by axis 108*c* in FIG. 5B is equal to the maximum of any sum of diameters of joints 102 positioned at the same height along apparatus 500.

Figure 6D:
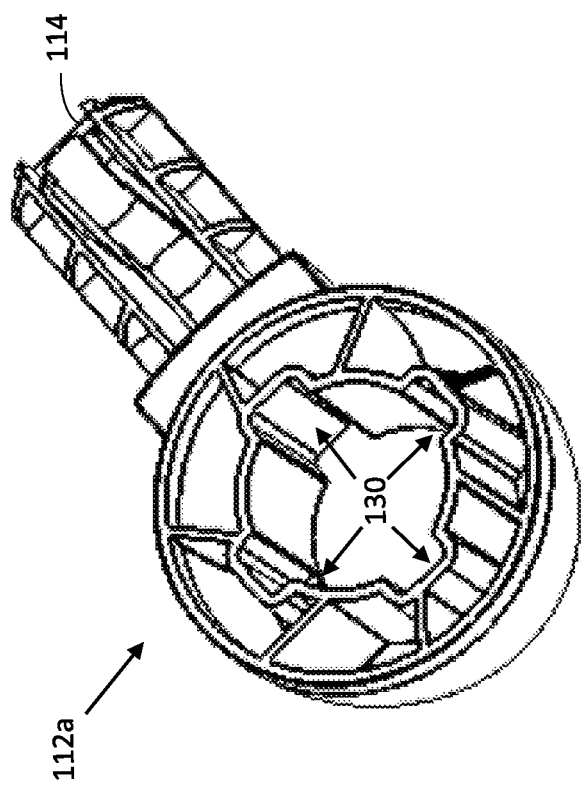

Reference is now made to FIGS. 6A-6D which show a securing mechanism for securing rotatable joint 102, in accordance with an embodiment. Joint 102 may be disposed with a securing mechanism comprising a lock 134, an exemplary implementation of which is shown in FIGS. 6A-6C, and at least one bushing 112*a*, an exemplary implementation of which is shown in FIG. 6D. Bushing 112*a* may replace at least one of bushings 112 of rotatable joint 102. Securing mechanism comprising bushing 112*a* and lock 134 may together prevent the rotation of any of bushings 112 and 112*a* about pivot 106, independently of fixing element 132. For the purpose of clarity, the following description will relate to joint 102 comprising two bushings: one bushing of type 112*a* and bushing of type 112 however this is not meant to be limiting, and joint 102 may include two bushings of type 112*a*. Similarly, although bushing 112*a* is shown positioned over bushing 112 on pivot 106, their order may be reversed, and bushing 112 may be positioned over bushing 112*a*.

Referring to FIG. 6D, bushing 112*a* may be substantially similar to bushing 112 with the noted difference that bushing 112*a* has at least an additional groove, or keyway 130 disposed along the length of the inner surface of bushing 112*a*. The additional keyway 130 of bushing 112*a* is positioned to align with at least one of the keyways 130 of bushing 112 positioned on pivot 106 to form a continuous groove along the inner surface of rotatable joint 102 when bar connectors 114 of bushings 112*a* and bushing 112 are oriented at a desired angle, such as to form a polygon corresponding to a desired three-dimensional assembly.

Lock 134 may comprise at least one prong that, when inserted into the continuous groove formed by the aligned keyways of bushing 112*a* and bushing 112, prevents the rotation of the two bushings about pivot 106, thereby locking rotatable joint 102. Similarly, the prong may be removed from the keyway of at one of the bushings positioned on pivot 106 to allow the rotation of the two bushings about pivot 106, thereby unlocking rotatable joint 102.

Referring to FIGS. 6A-6C, in this implementation, lock 134 is shown disposed with two prongs 136, connected via a connecting piece 138, such as a ring as shown in FIGS. 6A-6D. Optionally the connecting piece 138 may be a half ring (not shown). The inner surface of connecting piece 138 may be sized to fit over any of bars 104 and 400 allowing for sufficient clearance to allow connecting piece 138 to easily slide along the length of any of rods 104 and 400.

The length of prongs 136 may range from 1 cm to 10 cm, and may be approximately 4.5 cm±10%; the width of prongs 136, corresponding to the width of keyways 130, may range from 1 mm to 3 cm, and may be approximately 1 cm±10%; and the thickness of prongs 136 may range from 0.2 mm to 3 mm, and may be approximately 1 mm±10%.

The cross-section of prongs 136 may be sized to allow inserting prongs 136 lengthwise into keyways 130, allowing for sufficient clearance to easily insert and remove prongs 136 from keyways 130 to lock and unlock joint 102, accordingly. The length of prongs 136 may be greater than the height of any of bushings 112 and 112*a* and shorter than the combined height of any two of bushings 112 and 112*a* such that when fully inserted into rotatable lock 102, prongs 136 may engage with the aligned keyways 130 of any two of bushings 112 and 112*a*.

Optionally, bushing 112*a* may have two additional keyways 130 corresponding to the two prongs 136 of lock 134. When bar connectors 114 of bushing 112*a* and bushing 112 are oriented at the desired angle to form the desired polygon, the additional keyways 130 of bushing 112*a* align with the two keyways 130 of bushing 112, thereby forming two continuous grooves along the inner surface of rotatable joint 106.

Connecting piece 138 may be slid along bar 104 or 400 towards rotatable joint 102 and prongs 136 may be pushed into the two continuous grooves formed by the aligned keyways 130 of the two bushings to lock rotatable joint 102. Similarly, connecting piece 138 may be slid along bar 104 or 400 away from rotatable joint 102, and prongs 136 may be pulled out of at least one of bushings 112 or 112*a* to unlock rotatable joint 102 and allow the rotation of the two bushings about pivot 106.

Optionally, when the assembly is a two dimensional assembly, connecting piece 138 may be slid along a protrusion (not shown) of pivot 106 for locking and unlocking the joint 102.

Optionally, the angle formed by the bar connectors 114 when the keyways are aligned, and thus the orientation of keyways 130 about bushing 112*a* is substantially orthogonal, corresponding to constructing a modular cubic or cuboid assembly using multiple rotatable joints 102, such as shown in FIGS. 5A-5D.

Figure 7A:
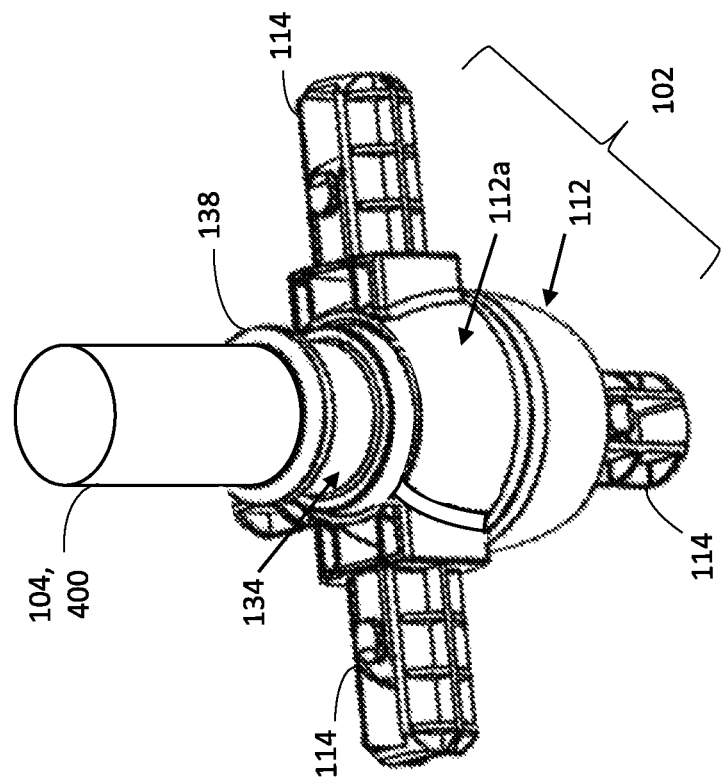
FIGS. 7A-7B show an exploded view, and assembled view, respectively, of a rotatable, lockable joint in accordance with an embodiment.
Figure 7B:
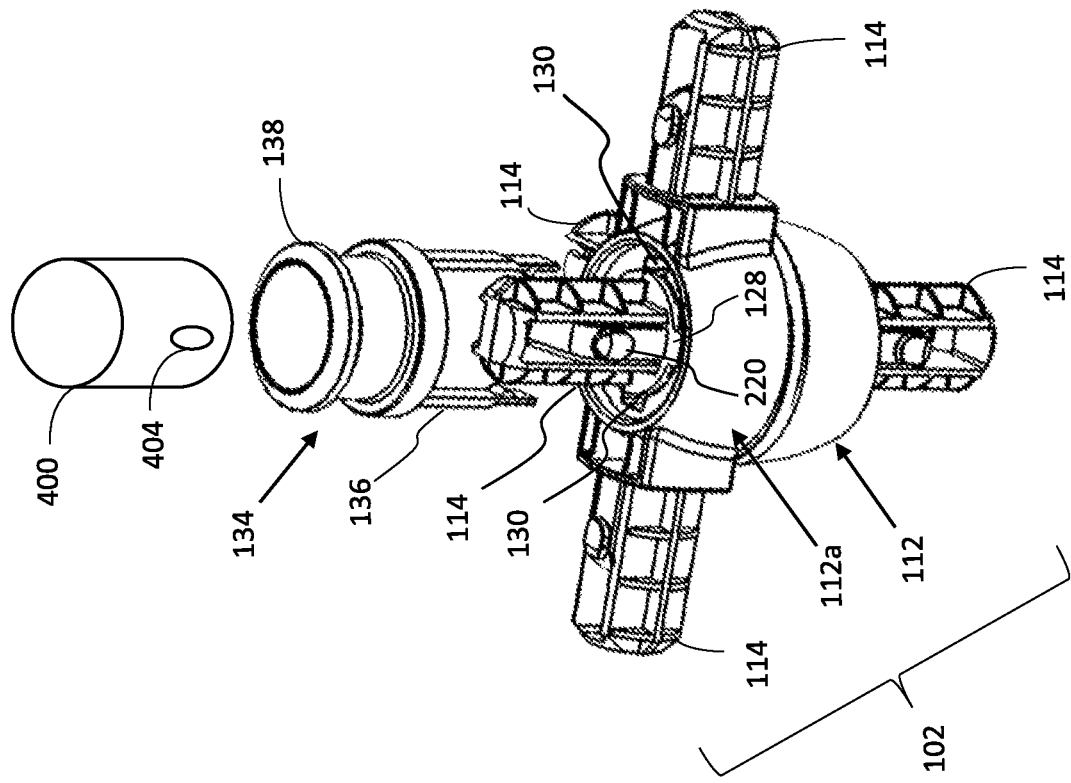

Referring to FIGS. 7A-7B, an exploded view, and assembled view of a rotatable, lockable joint 102 is shown, respectively, having two bushings positioned on pivot 106, at least one of which is bushing 112*a*, and lock 134. The additional pair of keyways 130 of bushing 112*a* may be positioned such that when multiple rotatable joints 102 assembled thus are connected via multiple bars 104 or 400 in an assembled open configuration, such as the cubic assemble shown in FIG. 5A, keyways 130 of each of the two bushings of any one of joints 102 align to provide a continuous groove along the inner surface of joint 102, unobstructed by keys 128. Oriented thus, prongs 136 of lock 134 may be pushed down into the continuous groove formed by the aligned keyways 130 of the two bushings, and fix the two bushings preventing their rotation about pivot 106, serving to lock rotatable joint 102 and secure the assembled open configuration (FIG. 7B).

Referring back to FIGS. 6A-6C, optionally, each of prongs 136 is disposed with a distally disposed bump 140 that catches the top of pivot 106, preventing prongs 136 from fully detaching from rotatable joint 102 when unlocking. Bump 140 may be positioned along the width of the inner surface of prongs 136 to provide a substantially smooth outer surface of prongs 136 facing the inner wall of the bushings and allow for smooth insertion of prongs 136 into the continuous groove formed by the aligned keyways 130. The distal tip of prongs 136 may be tapered to further allow for smooth insertion and removal from the continuous groove. The height of bump 140 may range from 0.5 mm to 2 mm, and may be approximately 1 mm±10%; the width of bump 140 may range from 0.5 mm to 2 mm, and may be approximately 1 mm±10%; and the length of bump 140, corresponding to the width of prong 130 may range from 3 mm to 7 mm, and may be approximately 5 mm±10%. The distance between the distal tip of prong 130 and bump 140 may be range from 1 mm to 20 mm, and may be approximately 10 mm±10%.

It may be appreciated that the pairs of oppositely disposed keyways 130 disposed with bushing 112a may be oriented at angles other than 90° about its inner surface, to allow for additional, non-cubic assemblies using multiple rotatable joints 102. For example, three keyway pairs may be provided oriented at 120° angles to allow aligning the keyways when the rods are connected to form a modular assembly of hexagons, similarly, the keyways pairs may be provided oriented at 60° to allow aligning the keyways when the rods are connected to form a modular assembly of triangles. Optionally, keyways 130 may be positioned about the inner surface of bushing 112a to allow alignment of at least one pair of oppositely facing keyways 130 of all the bushings, 112a and/or 112, positioned on pivot 106 when rods 104 and/or 400 are interconnected to joints 102 to form any combination of polygons that tile a plane. Thus aligned, prongs 136 of lock 134 may be inserted into the oppositely facing and aligned keyways 130 to secure bushings 112a and/or 112 and prevent their rotation about pivot 106, serving to secure joint 102. Optionally, each of joints 102 of an assembly of interconnected rods 104 and/or 400 may be provided with such a securing mechanism.

Figure 8A:
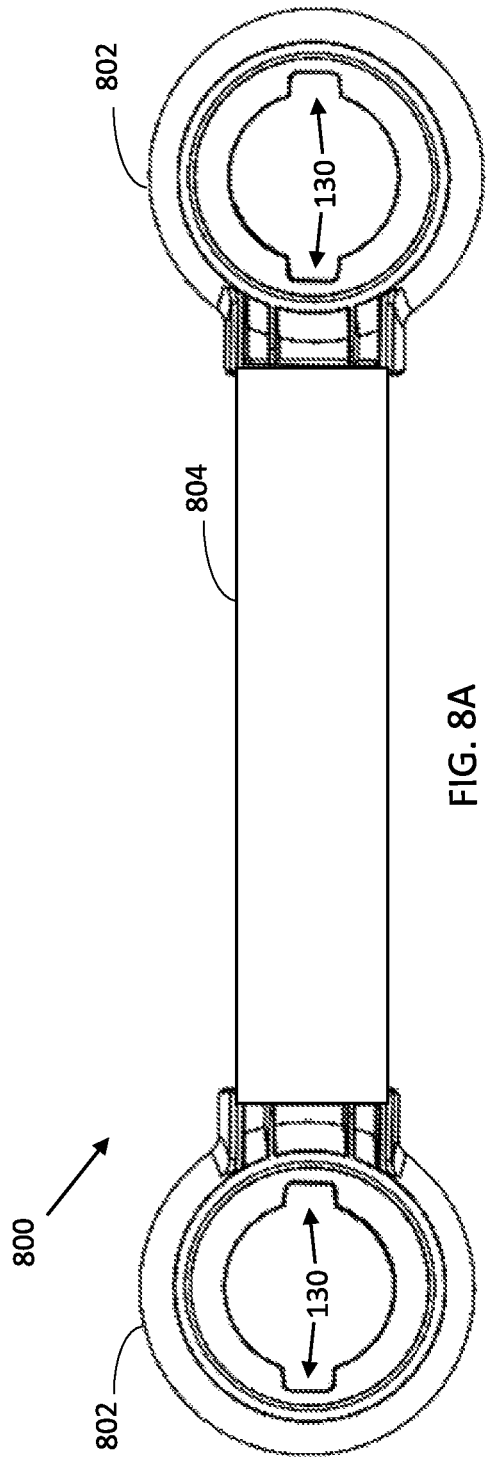
FIGS. 8A-8B show a connector for assembling a rotatable joint in accordance with another embodiment.

Reference is now made to FIG. 8A which shows a connector 800 for assembling a rotatable joint, in accordance with another embodiment. Connector 800 may include a bar 804 integrally connected at either end with two bushings 802. Bar 804 may have similar dimensions to bar 104 and/or bar 400. Bushings 802 may have dimensions that are be substantially similar to bushings 112 and 112a described above and may be sized to fit over pivot 106, allowing for sufficient clearance to easily rotate about pivot 106. Bushings 802 may be provided with one or more keyways 130 corresponding to keys 128. Pivot 106 thus disposed with one or more bushings 802 may comprise a rotatable joint in accordance with another embodiment.

Figure 8B:
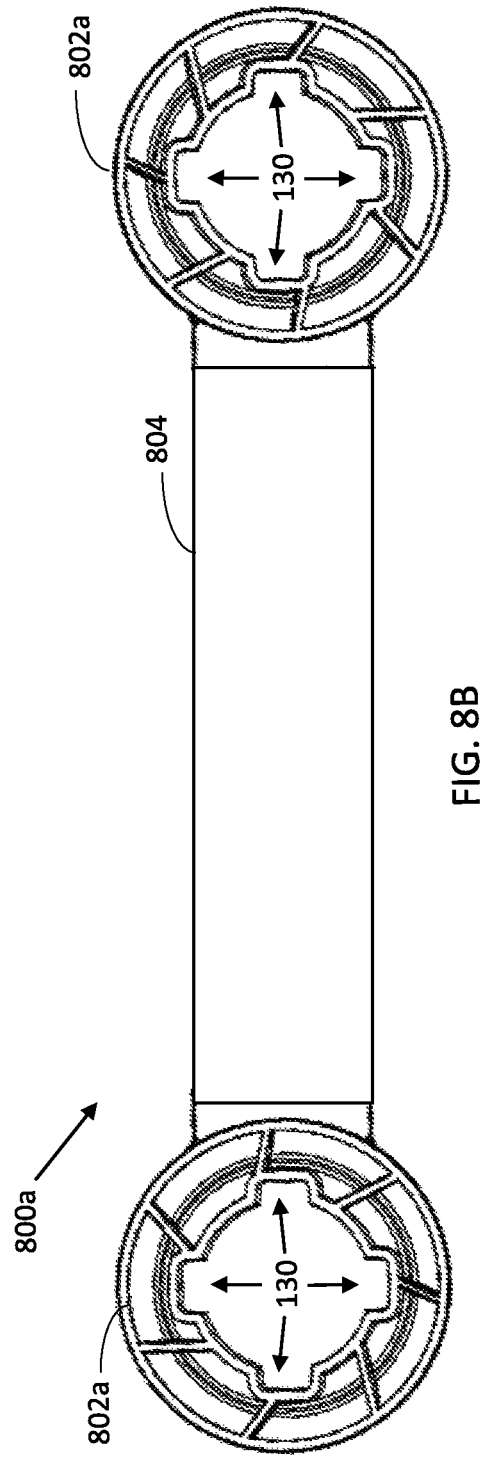

Referring to FIG. 8B, connector 800 is shown having two bushings 802a connected by bar 804. Bushings 802a may be substantially similar to bushings 802 with the notable difference of that, as with bushing 112a described above, bushings 802a have an additional pair of keyways 130 to allow locking the rotatable joint formed by at least two connectors 800 positioned over pivot 106.

Multiple connectors 800 with pivots 106 may be used to construct a two-dimensional, planar, foldable modular assembly, as follows: each connector 800 may connect two pivots 106 by sliding one of its bushings over one of the pivots 106 and the other bushing over the other pivot 106. Each pivot 106 may be configured to support multiple bushings, allowing each pivot 106 to interconnect to multiple other pivots 106. Rotating the bushings about the pivots 106 to align bars 804 in a substantially parallel configuration may fold the assembly, whereas rotating the bushings about pivots to increase the angles formed by bars 804 to a desired angle may open the assembly.

As described above, the inner surface of bushings 802 may be provided with one or more keyways 130 positioned at a desired angle with respect to each other, to allow aligning the keyways 130 of multiple different bushings. In the example above, bushing 802 is disposed with a pair of opposite facing keyways 130 and bushing 802a is disposed with two pairs of opposite facing keyways 130 oriented at 90°, however this implementation is not meant to be limiting. In other implementations, three keyways may be provided at 120° to each other, or six keyways 130 may be provided at 60° to each other, or eight keyways 130 may be provided at 45° to each other to allow constructing additional polygon shapes. Keys 128 may be similarly aligned on pivot 106 to accommodate the orientation of keyways 130 of the bushings. Keyways 130 may allow slipping any of bushings 802 and 802a over keys 128 of pivot 106, shown above.

To configured a rotatable joint using this implementation, at least two bushings of two connectors 800 may be positioned over pivot 106 thereby coupling the two bushings with pivot 106. Rotating the multiple bushings positioned on pivot 106 with respect to each other allows orienting bars 804 perpendicular to pivot 104 may cause the keyways 130 of both bushings align and form a continuous groove unobstructed by keys 128 when the rotation is at the desired angle, and may orient bars 804 to form the desired angle.

Figure 8C:
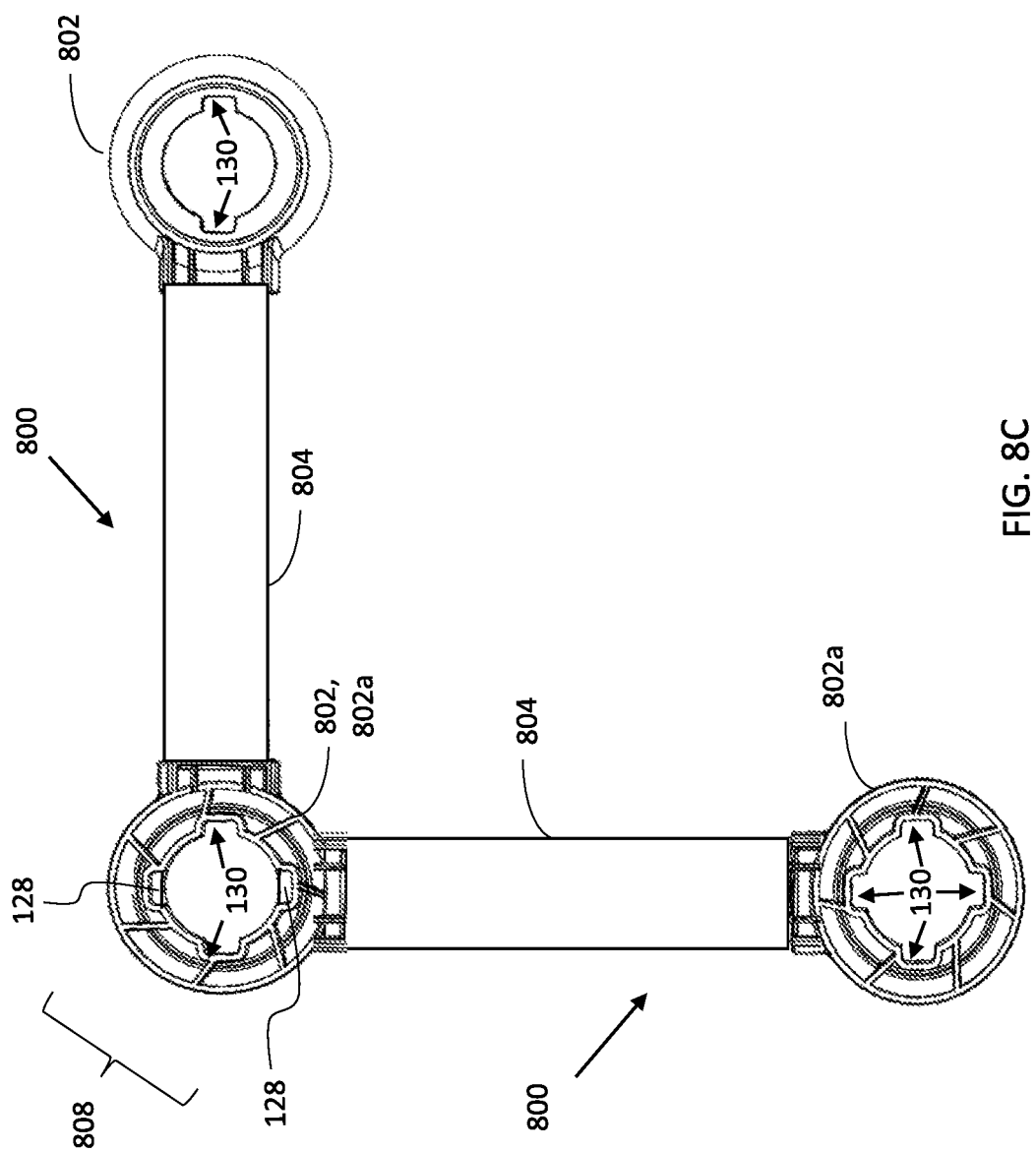
FIG. 8C shows a top view of a rotatable joint assembled using the connectors of FIGS. 8A-8B.

Referring to FIG. 8C, a top view of a rotatable joint 808 is shown having two bushings 802 and 802a of two connectors 800 superimposed over pivot 106. One of connectors 800 is disposed with two bushings 802 have two oppositely facing keyways 130. The other one of connectors 800 is disposed with two bushings 802a have four oppositely facing keyways 130. Keyways 130 of each of bushing 802 and 802a allow positioning the bushings over keys 128 of pivot 106. Rotating any of pivot 106 and bushings 802a or 802 with respect to each other may orients bars 804 orthogonal to each other and align keyways 130 of bushing 802 with one of the pairs of keyways 130 of bushing 802a unobstructed by keys 128, forming an exposed elongated groove along the inner surface of the rotatable joint 808. A lock (not shown), such as lock 134 may be provided as described above, having one or more prongs 136 that may be inserted into the continuous groove and lock the rotatable joint 808.

Figure 8D:
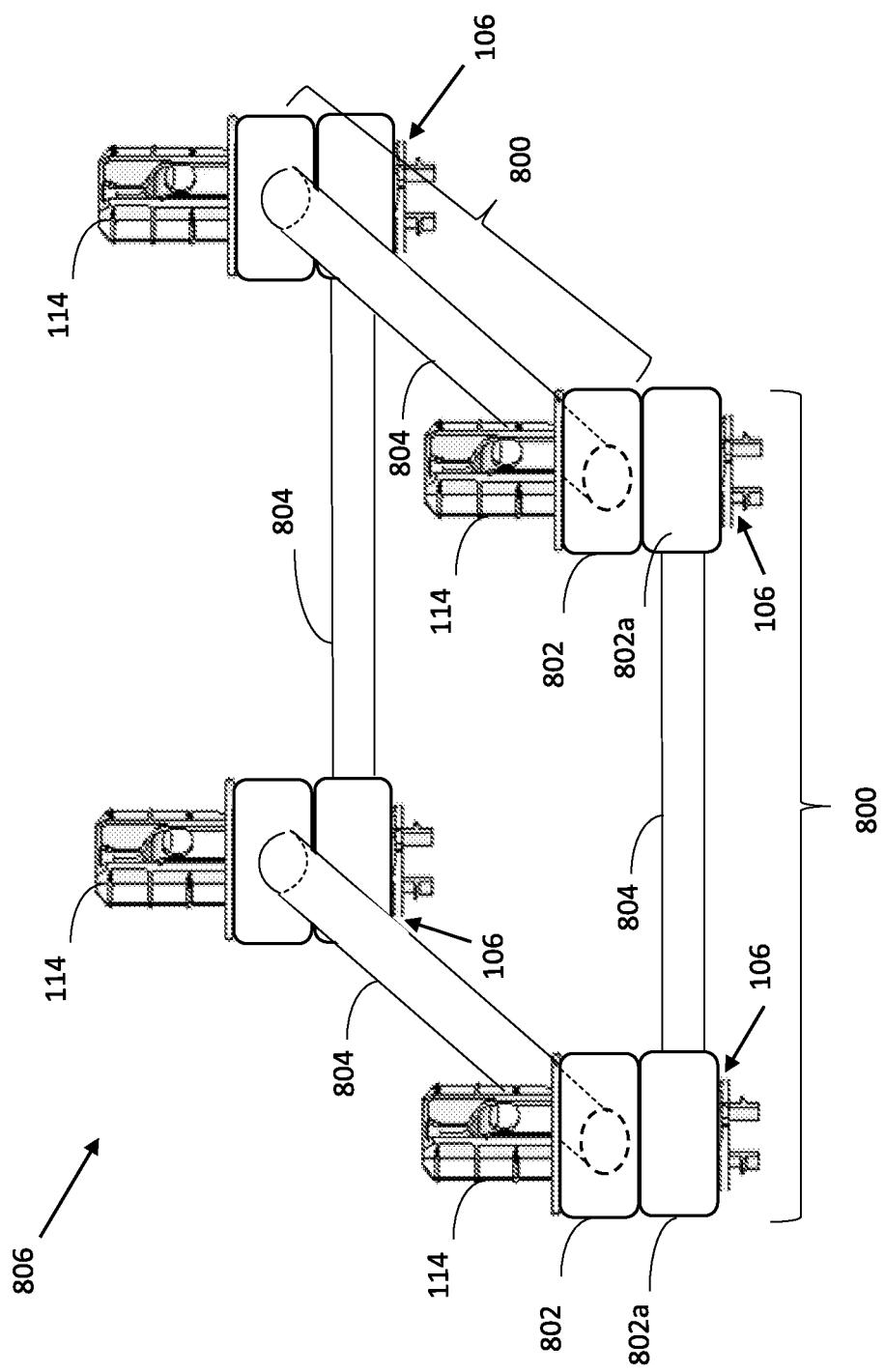
FIG. 8D shows a four-cornered foldable apparatus using the connectors of FIGS. 8A-8B.

Referring to FIG. 8D, a conceptual simplified illustration of a four-cornered foldable apparatus 806 is shown comprising four pivots 106 and four connectors 800. Each pivot 106 may support two or more bushings 802 and/or 802a of two or more connectors 800 forming a rotatable corner joint 808 of apparatus 806. Each joint 808 may be disposed with at least one bushing 802a having four keyways 130 (not shown). Aligning bars 804 of the two different connectors 800 on any one of joints 808 in an orthogonal orientation aligns the keyways 130 of bushings 802 and 802a on each joint 808 to form a continuous groove that allows locking the joints, as described above.

Pivot 106 may be configured for a two dimensional assembly with a single layer of connectors 800 having no bar connectors 114 and a safety cap 126 at either end, and may be long enough to support lock 134. Alternatively pivot 106 may be configured as illustrated above with respect to FIGS. 1D-1E having one or more bar connectors 114 longitudinally aligned with pivot 106 allowing to connect any of bars 104 and 400 orthogonal to bars 804 of connectors 800 for stacking multiple two-dimensional assemblies to form a modular, foldable three-dimensional structure from a combination of pivots 106, bars 400 and/or 104, connectors 800, and locks 134, such as shown in FIGS. 5A-5D.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A rotatable joint, comprising:
   at least three bar connectors;
   an axis piece comprising:
      a central pivot and at least a first bar connector of the at least three bar connectors longitudinally aligned with the central pivot, and
      a second bar connector oppositely aligned with the first bar connector;
   and
   two rotatable joint pieces each comprising a bushing and at least one of the at least three bar connectors oriented along the diameter of the bushing and aligned along an axis of symmetry of the bushing,
   wherein the bushing of each of the two rotatable joints pieces is configured to slide over the central pivot thereby coupling the two bushings with the central pivot and allowing the rotatable joint pieces to rotate about the central pivot, and orient the bar connectors of the rotatable joint pieces perpendicular to the first bar connector of the axis piece.

2. The rotatable joint of claim 1, wherein one of the rotatable joint pieces further comprises a second bar connector.

3. The rotatable joint of claim 2, wherein the second bar connector is oppositely aligned with the bar connector of the one rotatable joint piece.

4. The rotatable joint of claim 1, wherein the axis piece further comprises a safety cap disposed on the base of the central pivot opposite to the bar connector.

5. The rotatable joint of claim 1, wherein the central pivot is disposed with a flange, wherein the flange is configured to secure the two bushings when coupled with the central pivot.

6. A rotatable joint, comprising:
   at least three bar connectors;
   an axis piece comprising a central pivot and at least one of the at least three bar connectors longitudinally aligned with the central pivot; and
   two rotatable joint pieces each comprising a bushing and at least one of the at least three bar connectors oriented along the diameter of the bushing and aligned along an axis of symmetry of the bushing,
   wherein the bushing of each of the two rotatable joints pieces is configured to slide over the central pivot thereby coupling the two bushings with the central pivot and allowing the rotatable joint pieces to rotate about the central pivot, and orient the bar connectors of the rotatable joint pieces perpendicular to the bar connector of the axis piece, and
   wherein the central pivot is disposed with one or more rectangular keys and wherein the inner surface of each bushing is disposed with one or more keyways corresponding the one or more rectangular keys.

7. The rotatable joint of claim 6, further comprising a lock comprising at least one prong,
   wherein the inner surface of a first one of the two bushings is disposed with a first additional keyway positioned to align with at least one of the keyways of the second one of the two bushings and form a continuous groove along the inner surface of the rotatable joint, when the bar connectors of each of the two rotatable joint pieces are oriented at an angle of a polygon,
   wherein the prong is configured to be inserted into the continuous groove formed by the aligned keyways of the two bushings and prevent the rotation of the two bushings about the pivot, thereby locking the rotatable joint, and
   wherein the prong is configured to be removed from the keyway of at one of the bushings and allow the rotation of the two bushings about the pivot, thereby unlocking the rotatable joint.

8. The rotatable joint of claim 7, wherein the lock comprises two prongs connected by a connecting piece, and
   wherein the inner surface of the first one of the two bushings is disposed with a second additional keyway,
   wherein, when the bar connectors of each of the two rotatable joint pieces are oriented at the angle of the polygon, the first and second additional keyways of the first one of the two bushings are configured to align with two keyways of the second one of the two bushings thereby forming two continuous grooves along the inner surface of the rotatable joint,
   wherein the prongs are configured to be inserted into the two continuous grooves formed by the aligned keyways of the two bushings and lock the rotatable joint,
   and wherein the prongs are configured to be removed from the two keyways of at least one of the bushings and allow the rotation of the two bushings about the pivot, thereby unlocking the rotatable joint.

9. The rotatable joint of claim 8, wherein the angle is substantially orthogonal.

10. The rotatable joint of claim 8, wherein the connecting piece is configured to fit over a bar configured to attach to the bar connector of the central pivot, wherein locking the rotatable joint comprises sliding the connecting piece along the bar towards to rotatable joint and pushing the prongs into the continuous grooves formed by the aligned keyways of the two bushings, and wherein unlocking the rotatable joint comprises sliding the connecting piece along the bar away from the rotatable joint and pulling the prongs out of the keyways of at least one of the bushings.

11. The rotatable joint of claim 10, wherein each prong is disposed with a bump that prevents fully detaching from the rotatable joint when unlocking.

12. A rotatable joint, comprising:
   at least three bar connectors;
   an axis piece comprising a central pivot and at least one of the at least three bar connectors longitudinally aligned with the central pivot; and
   two rotatable joint pieces each comprising a bushing and at least one of the at least three bar connectors oriented along the diameter of the bushing and aligned along an axis of symmetry of the bushing,
   wherein the bushing of each of the two rotatable joints pieces is configured to slide over the central pivot thereby coupling the two bushings with the central pivot and allowing the rotatable joint pieces to rotate about the central pivot, and orient the bar connectors of the rotatable joint pieces perpendicular to the bar connector of the axis piece, and
   wherein the bar connector comprises a spring, the spring comprising:
   a distal flat tab;
   a proximal flat tab;

a substantially diagonal bridge connecting the distal flat tab and the proximal flat tab; and a button-like piece located on the proximal tab, wherein the proximal flat tab or the distal flat tab connect to a shaft of the bar connector and are flush with a face of the shaft, and the distal tab or the proximal tab, respectively, does not connect to the shaft and is flush with another face of the shaft.

13. The rotatable joint of claim 12, further comprising a second button-like piece located on the distal tab.

14. The rotatable joint of claim 13, wherein the second button-like piece has a gradient in at least a proximal or a distal face.

15. The rotatable joint of claim 12, wherein the button-like piece has a gradient in at least a proximal or a distal face.

16. The rotatable joint of claim 12, wherein the distal flat tab and the proximal flat tab are parallel to each other.

17. The rotatable joint of claim 12, further comprising one or more bars comprising a hole corresponding to the button-like piece, wherein button-like piece is configured to pop out of the corresponding hole when the bar couples with the bar connector.

\* \* \* \* \*